United States Patent [19]

DiMartino, Sr. et al.

[11] Patent Number: 5,006,132
[45] Date of Patent: Apr. 9, 1991

[54] MEMBRANE PROCESSED PURIFIED PIPELINE GAS

[75] Inventors: Stephen P. DiMartino, Sr., Topton; James C. Sorensen, Allentown, both of Pa.

[73] Assignee: Air Products and Chemicals, Inc., Allentown, Pa.

[21] Appl. No.: 537,182

[22] Filed: Jun. 12, 1990

[51] Int. Cl.$^5$ ............................................. B01D 53/22
[52] U.S. Cl. ............................................. 55/16; 55/68
[58] Field of Search .......................... 55/16, 68, 158

[56] References Cited

U.S. PATENT DOCUMENTS

| | | | |
|---|---|---|---|
| 2,970,106 | 1/1961 | Binning et al. | 55/16 X |
| 3,144,313 | 8/1964 | Pfefferle | 55/16 |
| 3,713,271 | 1/1973 | Franz et al. | 55/16 |
| 3,986,350 | 10/1976 | Schmidt | 60/274 |
| 4,119,417 | 10/1978 | Heki et al. | 55/16 X |
| 4,130,403 | 12/1978 | Cooley et al. | 55/16 |
| 4,264,338 | 4/1981 | Null | 55/16 |
| 4,370,150 | 1/1983 | Fenstermaker | 55/16 |
| 4,374,657 | 2/1983 | Schendel et al. | 62/19 |
| 4,529,411 | 7/1985 | Goddin, Jr. et al. | 55/16 |
| 4,597,777 | 7/1986 | Graham | 55/16 |
| 4,654,047 | 3/1987 | Hopkins et al. | 62/23 |
| 4,657,564 | 4/1987 | Langsam | 55/16 |
| 4,689,267 | 8/1987 | Takamizawa et al. | 55/16 X |
| 4,690,695 | 9/1987 | Doshi | 55/16 |
| 4,701,187 | 10/1987 | Choe et al. | 55/16 |
| 4,755,193 | 7/1988 | Higashimura et al. | 55/16 |
| 4,836,833 | 6/1989 | Nicholas et al. | 55/16 |
| 4,859,215 | 8/1989 | Langsam et al. | 55/16 |
| 4,863,492 | 9/1989 | Doshi et al. | 55/16 |
| 4,875,945 | 10/1989 | Penzhorn et al. | 55/16 X |
| 4,955,998 | 9/1990 | Ueda et al. | 55/16 |
| 4,957,513 | 9/1990 | St. Hilaire | 55/16 |

*Primary Examiner*—Robert Spitzer
*Attorney, Agent, or Firm*—Geoffrey L. Chase; James C. Simmons; William F. Marsh

[57] ABSTRACT

The present invention is directed to a method for removing a higher purity sidestream of a product gas from a main product pipeline gas flow stream of lower purity using a membrane selective for the product gas in contrast to impurities contained in the main product pipeline gas. The process avoids capital intensive apparatus or energy intensive processing and returns the reject gas from the membrane to the pipeline for inclusion with the main product pipeline gas. Recovery of a higher purity component of a main pipeline product gas containing that component is also contemplated.

27 Claims, 2 Drawing Sheets

MEMBRANE PROCESSED PURIFIED PIPELINE GAS

FIELD OF THE INVENTION

The present invention is directed to the field of membrane separations. More specifically, the present invention is directed to recovering a higher purity product from a lower purity product using membranes wherein the reject gas is returned to the lower purity product without a significant diminution in the pressure or purity of the resulting downstream lower purity product.

BACKGROUND OF THE PRIOR ART

The use of membranes for gas separations is widely known. The separation of gases by membranes requires the selection of specific materials which selectively permeate one gas composition preferentially to other gas compositions. Typically, separation of gas mixtures with membranes results in a reject gas or gas which does not permeate through the membrane as well as a permeate gas, one of which is of unacceptable value and therefore vented or used for low value end uses, such as combustion.

It is also known to supply large volume industrial gases such as hydrogen, helium, argon, methane, oxygen or nitrogen via pipeline from a major source of the industrial gas to one or more end users. Such pipeline industrial gas is generally of a very high quality, including pressure and purity, so as to suit the needs of most of the pipeline customers for the industrial gas. However, with the advent of industrial gas consumption by new applications in industry which require ultra high standards, it has become necessary to supply such new applications with pipeline volumes of industrial gases, which meet even higher purity standards than traditional quality industrial gas pipeline supplies provide.

Purification stations branching off of industrial gas pipelines have been known to be used, but these require capital intensive purification hardware and/or energy intensive pressurization or repressurization for appropriate processing.

U.S. Pat. No. 3,986,350 discloses a process for filtering hydrogen through a membrane for subsequently combustion.

U.S. Pat. No. 4,130,403 discloses a process for removing hydrogen sulfide and carbon dioxide from natural gas using a membrane.

U.S. Pat. No. 4,264,338 discloses a process wherein various reject streams are returned to a feed stream in a multiple membrane separation.

U.S. Pat. No. 4,374,657 discloses a process which includes a membrane for removal of hydrogen sulfide and carbon dioxide from an ethane and carbon dioxide stream.

U.S. Pat. No. 4,529,411 discloses a process for removing carbon dioxide from a hydrocarbon stream which contains residual carbon dioxide.

U.S. Pat. No. 4,597,777 discloses a membrane process wherein a reject methane-rich product is separated from a carbon dioxide and methane permeate, the latter of which is combusted.

U.S. Pat. No. 4,654,047 discloses a process wherein a hydrogen is removed as a permeate through a membrane from a feed gas stream and the reject gas is processed cryogenically to upgrade the hydrogen content in the reject gas, which is then recycled to the feed gas stream.

U.S. Pat. No. 4,690,695 discloses multiple membrane systems for recovering hydrogen from mixtures with methane.

U.S. Pat. No. 4,863,492 discloses a process wherein a permeate from a feed gas stream passes through a membrane, is further upgraded in a pressure swing absorption unit and the reject from the pressure swing absorption unit is recycled to the reject from the membrane.

The prior art has failed to suggest a solution to the problem of providing a low cost, higher purity sidestream gas product from a main product pipeline gas of lower, but still valuable purity level, while avoiding capital intensive elaborate apparatus or energy intensive processing. The present invention overcomes this problem as will be set forth in greater detail below.

BRIEF SUMMARY OF THE INVENTION

The present invention is a process for removing a higher purity component sidestream product gas from a lower purity main product pipeline gas containing that component, with insignificant main pipeline gas pressure drop and purity loss, so as to maintain the approximate pressure and purity of the main product pipeline gas downstream of the sidestream product gas removal, comprising: (a) contacting at least a portion of the main product pipeline gas with the feed side of a membrane, that selectively permeates component product gas over any other component of the main product pipeline gas, (b) permeating the component product gas through the membrane, preferentially over the other components of the main product pipeline gas by reduced pressure on the permeate side of the membrane, (c) recovering a higher purity component sidestream product gas from the permeate side of the membrane and (d) commingling the reject gas from the feed side of the membrane with the main product pipeline gas downstream of the sidestream product gas removal.

Preferably, the membrane is located in the pipeline of the main product pipeline gas flow.

Typically, the component recovered in the sidestream product gas is selected from the group consisting of hydrogen, helium, or oxygen.

Typically, the membranes which are utilizable with regard to the separation of hydrogen are polysulfone or cellulose acetate, for helium are polysulfone or cellulose acetate, or for oxygen are polyimides, poly(trimethylsilylpropyne) or poly(trimethylgermylpropyne).

Preferably, the main product pipeline gas has a purity of 99.5 volume percent product gas in contrast to impurities. More preferably, the main pipeline product gas has a purity of 99.7 volume percent product gas in contrast to impurities.

Preferably, the sidestream product gas has a purity of 99.9 volume percent product gas in contrast to impurities. Optimally, the sidestream product gas has a purity of 99.9 volume percent product gas in contrast to impurities.

Specifically, the main product pipeline gas is hydrogen at 99.7 volume percent containing impurities of nitrogen at 0.15 volume percent and methane at 0.15 volume percent.

Typically, the main product pipeline gas is at a pressure of 200 psia.

Preferably, the sidestream product gas is recovered at a pressure of 180 psia. Alternatively, the sidestream product gas is recovered at a pressure of 20 psia.

More specifically, the present invention is directed to a process for removing a higher purity sidestream product gas from the lower purity main product pipeline gas which pipeline gas contains impurities in excess of the impurities acceptable in the sidestream product gas, with insignificant main product pipeline gas pressure drop and purity loss, so as to maintain the approximate quality of the main product pipeline gas downstream of the sidestream product gas removal, comprising:

(a) Removing a slip stream of the main product pipeline gas from a main pipeline, (b) Passing the slip stream over the feed side of a membrane selective for the product gas in contrast to impurities contained in the main product pipeline gas, (c) Permeating a higher purity sidestream product gas through the membrane to the permeate side of the membrane by reduced pressure on the permeate side of the membrane, (d) Recovering the higher purity sidestream product gas at a pressure lower than the main product pipeline gas pressure, but with a higher purity than the main product pipeline gas purity, and (e) Returning the reject gas of the slip stream from the feed side of the membrane to the main product pipeline gas.

DETAILED DESCRIPTION OF THE INVENTION

Figure 1:
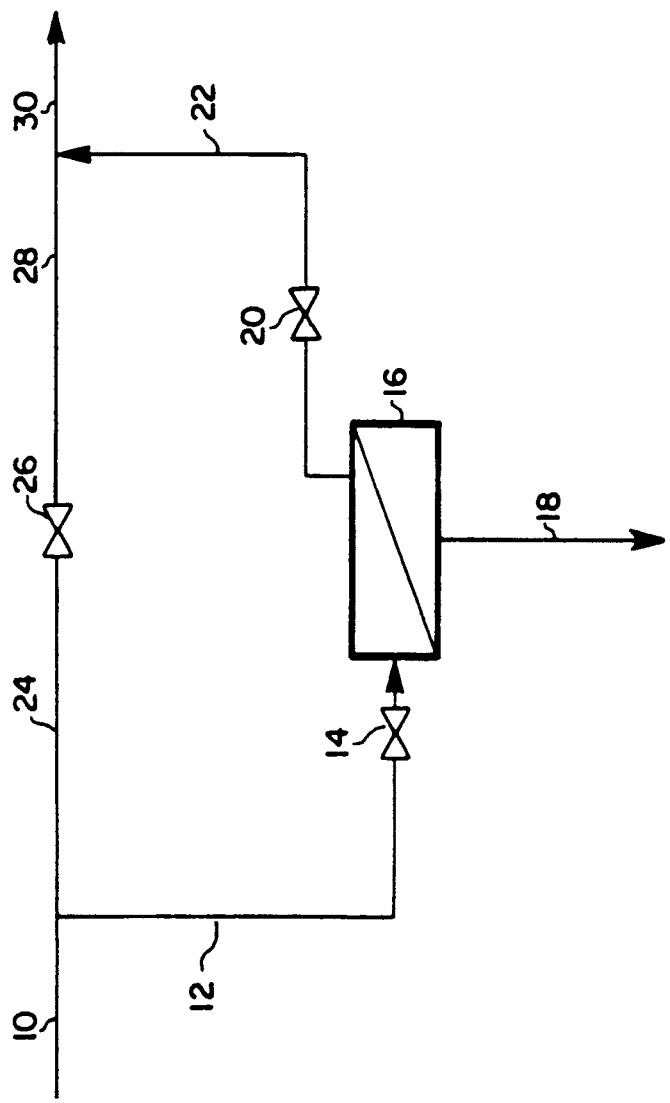
FIG. 1 is a schematic flow scheme of one embodiment of the present invention, utilizing a pressure drop in the main product pipeline.

The present invention permits removal of custom purity product from a main pipeline conducting product quality industrial gases. Product quality industrial gases typically have at least some residual impurities at acceptable levels for most, if not all, of the customers being served on the industrial gas pipeline. However, with the advent of requirements for even high purity industrial gases, such as the requirements in high purity chemical manufacturing, a need has arisen to provide at least some of the industrial gases passing through an industrial gas pipeline at higher purities than the bulk of the gas passing through the pipeline. Despite the availability of small purification apparatus such as cryogenic or adsorptive systems that have previously provided higher purity gas for industrial gas pipeline customers, the present invention offers a desirable low cost, low power alternative. It is not generally feasible to upgrade the entire flow of an industrial gas through a main industrial gas pipeline. This would require too great a pressure drop for the resulting purity achieved. In addition, processing the entire flow of an industrial gas pipeline would upgrade the resulting product beyond that required for many of the customers of the industrial gas pipeline.

Therefore, it has been ascertained that the present invention offers a desirable alternative for demanding requirements for industrial gases from main industrial gas pipeline sourcing. The present invention constitutes a membrane unit installed in either the main industrial gas pipeline or a membrane unit installed in a slip stream pipeline of the main industrial gas pipeline, so that a permeate of the membrane will produce a sidestream of the desired higher purity of a component of the product gas passing through the main pipeline, which in the case of the component being the major component of the pipeline such main product gas has a lower though still acceptable purity of product gas containing various small amounts of impurities. The membrane in this instance would be designed to minimize pressure drop and would allow the product gas to permeate selectively more preferentially than impurities contained in the main product pipeline gas.

For example, a cellulose acetate membrane can yield high purity, 99.9 plus volume percent hydrogen from a main pipeline of industrial gas hydrogen having a composition of 99.7 volume percent hydrogen, 0.15 volume percent nitrogen, and 0.15 volume percent methane, the latter two of which can be deemed to be impurities for some applications. The gas would be flowing through the main pipeline at a pressure of 200 psia. With a permeate-side pressure from the membrane of 180 psia, it is possible to obtain a sidestream hydrogen product of 99.9 volume percent, while at a permeate-side pressure of 20 psia, it is possible to produce a sidestream hydrogen product gas of 99.99 volume percent.

Similar enhancement of main pipeline industrial gas can be achieved using a slip stream process through a membrane to produce a sidestream product gas of higher purity, when the industrial gas contains a minor component such as helium or oxygen. These gases are recovered in higher purity from the major component or components of the main pipeline gas. Additional gases which can be contemplated include any gas which will permeate through an available membrane composition more readily than the impurities or other components that accompany it in its pipeline. The use of the term impurity is meant to include, for example, the recovery of a higher purity hydrogen sidestream product from synthesis gas passing through a main product pipeline, wherein the reject or impurity can be carbon monoxide, carbon dioxide and methane. The carbon monoxide, carbon dioxide or methane is valuable in its own right despite being classified for the purpose of this invention as an impurity. Therefore, impurity is deemed to mean any second gas component residing in the main product pipeline gas flow which is not desired in the sidestream product. Another example of the application of the present invention would be to recover a 30% oxygen sidestream product from a main product pipeline containing compressed air. In this instance, the oxygen is not of high purity, but is still of higher purity than the 21% oxygen in the compressed air of the main product pipeline gas. Recovery of a higher purity portion of helium which resides in a predominantly methane main product pipeline gas as a minor component is also contemplated.

In each of these cases, the present invention returns the reject gas to the main pipeline. The return of the reject gas from the membrane is not deemed to be a disadvantage because the slip stream removed for treatment in the membrane from the main pipeline is comparatively small in flow volume compared to the main product pipeline gas flow and thus the reject does not have a significant impact on overall purities of the main product pipeline gas as it flows downstream from the point of return or recycle of the reject gas. This is the result of the dilution of the increased impurity content of the reject stream in the overwhelmingly larger flow volume of the main product pipeline gas flow.

The membranes can be selected from a wide array of materials. For instance, for product gas comprising hydrogen, the membranes can be selected from the group of polysulfone or cellulose acetate. For product gas comprising helium, the membrane material can be selected from the group of polysulfone or cellulose acetate. For a product gas comprising oxygen, the membrane material can be selected from the group of polyimides, poly(trimethylsilylpropyne) or poly(trimethylgermylpropyne).

In the first embodiment of the present invention, the sidestream product gas can be removed from the main pipeline via a membrane situated in the main pipeline, a plurality of hollow fiber membranes allowing shell-side flow of the main product pipeline gas and bore-side flow of the sidestream product, or coil wound flat membranes with flow of the main product pipeline gas across the membrane to minimize pressure drop and with sidestream product flow through the membrane to a central bore connected to the side stream product flow circuit. In this instance, the main pipeline product gas constitutes the feed to the membrane and readily commingles with the reject from the membrane, which passes over the feed side of the membrane. A separate slip stream of main pipeline product gas is not required. Product gas immediately adjacent the feed side of the membrane is permeated through the membrane due to the induced pressure drop between the main product pipeline gas and the permeate side of the membrane. This embodiment is not illustrated.

Another embodiment of the present invention is shown in FIG. 1. With reference to that figure, the main pipeline 10 feeds main product pipeline gas to the apparatus of the present invention, wherein a slip stream 12 of product gas is removed from the main pipeline and passes through an isolation valve 14 and flows over the feed side of membrane unit 16, wherein product gas or the desired component in the main product pipeline gas is selectively permeated across the membrane to the permeate side of the membrane 16, due to a reduced pressure and is recovered as the desired component sidestream product gas in line 18. The reject gas, including some product gas and most all of the contained impurities or the other components of the main product pipeline gas, is removed from the feed side of the membrane and passes through isolation valve 20 and is returned in reject line 22 to the main pipeline. The main pipeline product gas flows through the main pipeline 10 and further through pipeline 24 downstream of the slip stream pipeline 12 and is processed through a pressure drop of reduced orifice or appropriate valving 26, which results in a slightly lower pressure main pipeline product gas flow in line 28. The gas in line 28 is mixed with the recycling reject gas 22 to result in the downstream main product pipeline gas 30 at a slightly reduced pressure and flow, which has a negligible reduction in purity of product gas with the increased impurities or non-desired components being commingled or returned in line 22. The pressure reduction means 26 allows for flow of the slip stream through the various conduits and across the membrane unit 16 and return by the differential pressures induced therein. No compression or elaborate apparatus, which may be energy consuming, is required.

Figure 2:
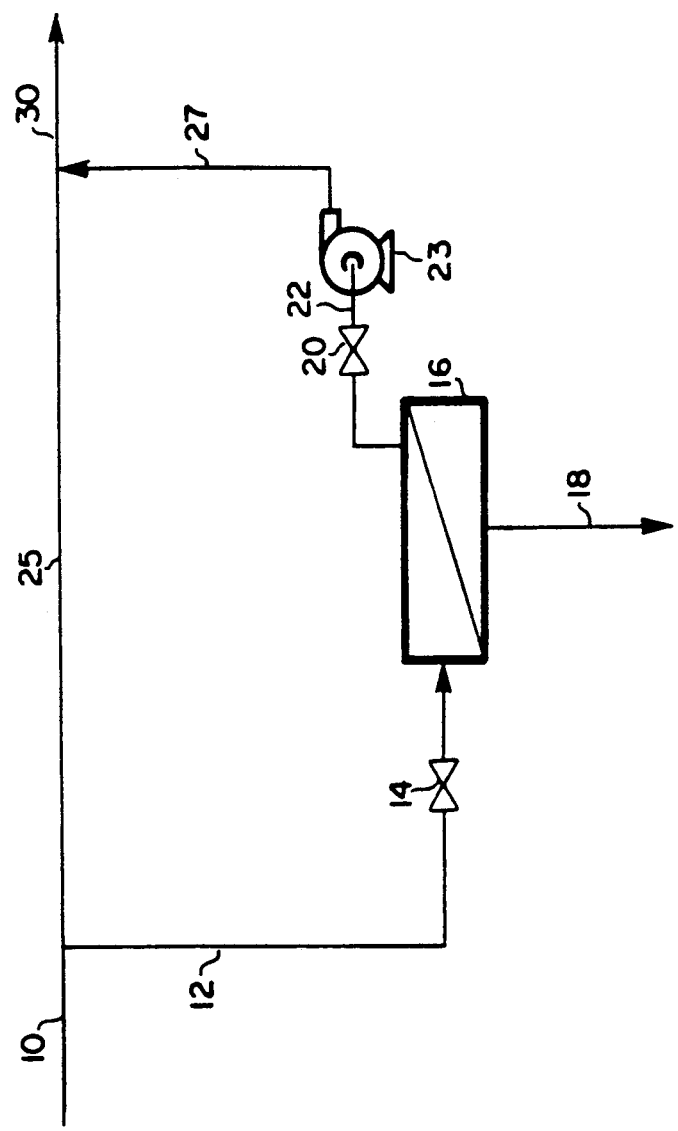
FIG. 2 is a schematic flow scheme of an embodiment of the present invention using recompression to return a reject stream to the main product pipeline.

In FIG. 2, an alternate embodiment to the present invention is set forth, wherein essentially the same flow scheme is present, but no pressure reduction exists in the main pipeline 25 and a recompressor 23 is located in the reject gas recycle line 22. This results in a higher pressure reject recycle in line 27 being commingled with the main pipeline product gas 25 to result in the downstream main product pipeline gas in line 30. All other numbers represent corresponding parts and represent similar functions and apparatus to FIG. 1. The embodiment of FIG. 2 requires some expenditure for compressor apparatus and power, but avoids the energy loss required in inducing pressure drop across the main pipeline as set forth in FIG. 1. Essentially, FIG. 1 and FIG. 2 represent a tradeoff between energy loss in the main pipeline due to pressure drop versus the apparatus cost and energy input of the recompression when the main pipeline is not reduced in pressure for the purpose of recovering the sidestream product gas.

Typically, such a system is designed to take relatively high purity industrial gas of 90 plus percent purity with negligible impurities and extracts a higher purity product gas as a sidestream, while returning the reject which is still rich in product gas to the main pipeline. By use of the present invention which adjusts purities at the high purity level by small increments, a variety of industrial gas users may be sourced from a single industrial gas pipeline. As set forth earlier, a typical industrial gas pipeline having hydrogen at 200 psia with a purity of 99.7 volume percent hydrogen and carrying impurities of nitrogen and methane can be processed by the present invention to recover a sidestream of 99.9 volume percent hydrogen at 180 psia or alternatively a sidestream of 99.99 volume percent hydrogen at 20 psia. Similar results can be expected from the other product gases denominated above. The present invention results in a unique and desirable tailoring of industrial gas supply to individual customers needs without the necessity of elaborate retrofitting, apparatus installation or energy intensive processing.

The present invention has been set forth with regard to several embodiments, but the full scope of the present invention should be ascertained from the claims which follow.

We claim:

1. A process for removing a higher purity component sidestream product gas from a lower purity main product pipeline gas containing that component, with insignificant main pipeline gas pressure drop and purity loss so as to maintain the approximate pressure and purity of the main product pipeline gas downstream of the sidestream product gas removal, comprising: (a) contacting at least a portion of the main product pipeline gas with the feed side of a membrane, that selectively permeates the component product gas over any other components of the main product pipeline gas, (b) permeating the component product gas through the membrane preferentially over the other components of the main product pipeline gas by reduced pressure on the permeate side of the membrane, (c) recovering a higher purity component sidestream product gas from the permeate side of the membrane, and (d) commingling the reject gas from the feed side of the membrane with the main product pipeline gas downstream of the sidestream product gas removal.

2. The process of claim 1 wherein the membrane is in the pipeline carrying the main product pipeline gas.

3. The process of claim 1 wherein the component recovered in the sidestream product gas is selected from the group consisting of hydrogen, helium and oxygen.

4. The process of claim 1 wherein the membrane is selected from the group consisting of polysulfone and cellulose acetate.

5. The process of claim 1 wherein the membrane is selected from the group consisting of polyimides, poly(trimethylsilylpropyne) or poly(trimethylgermylpropyne).

6. The process of claim 1 wherein the main pipeline product gas has a purity of 99.5 volume percent product gas.

7. The process of claim 1 wherein the main pipeline product gas has a purity of 99.7 volume percent product gas.

8. The process of claim 1 wherein the sidestream product gas has a purity of 99.9 volume percent product gas.

9. The process of claim 1 wherein the sidestream product gas has a purity of 99.99 volume percent product gas.

10. The process of claim 1 wherein the main product pipeline gas is hydrogen at 99.7 volume percent, nitrogen at 0.15 volume percent and methane at 0.15 volume percent.

11. The process of claim 1 wherein the main product pipeline gas is at a pressure of 200 psia.

12. The process of claim 1 wherein the sidestream product gas is at a pressure of 180 psia.

13. The process of claim 1 wherein the sidestream product gas is at a pressure of 20 psia.

14. A process for removing a higher purity sidestream product gas from a lower purity main product pipeline gas which pipeline gas contains impurities in excess of the impurities acceptable in the sidestream product gas, with insignificant main product pipeline gas pressure drop and purity loss so as to maintain the approximate quality of the main product pipeline gas downstream of the sidestream product gas removal, comprising:

(a) removing a slipstream of the main product pipeline gas from a main pipeline;

(b) passing the slipstream over the feed side of a membrane selective for the product gas in contrast to impurities contained in the main product pipeline gas;

(c) permeating a higher purity sidestream product gas through the membrane to the permeate side of the membrane by reduced pressure on the permeate side of the membrane;

(d) recovering the higher purity sidestream product gas at a pressure lower than the main product pipeline gas pressure, but with a higher purity than the main product pipeline gas purity, and (e) returning the reject gas of the slipstream from the feed side of the membrane to the main product pipeline gas.

15. The process of claim 14 wherein the slipstream is removed from the main pipeline upstream of a pressure drop in the main pipeline and the reject gas from the feed side of the membrane is returned to the main pipeline downstream of the pressure drop.

16. The process of claim 14 wherein the reject gas from the feed side of the membrane is recompressed to the pressure of the main product pipeline gas before returning the reject gas to the main product pipeline gas.

17. The process of claim 14 wherein the main product pipeline gas is selected from the group consisting of hydrogen, helium and oxygen.

18. The process of claim 14 wherein the membrane is selected from the group consisting of polysulfone and cellulose acetate.

19. The process of claim 14 wherein the membrane is selected from the group consisting of polyimides, poly(trimethylsilylpropyne) or poly(trimethylgermylpropyne).

20. The process of claim 14 wherein the main product pipeline gas has a purity of 99.5 volume percent product gas.

21. The process of claim 14 wherein the main product pipeline gas has a purity of 99.7 volume percent product gas.

22. The process of claim 14 wherein the sidestream product gas has a purity of 99.9 volume percent product gas.

23. The process of claim 14 wherein the sidestream product gas has a purity of 99.99 volume percent product gas.

24. The process of claim 14 wherein the main product pipeline gas is hydrogen at 99.7 volume percent, nitrogen at 0.15 volume percent and methane at 0.15 volume percent.

25. The process of claim 14 wherein the main product pipeline gas is at a pressure of 200 psia.

26. The process of claim 14 wherein the sidestream product gas is at a pressure of 180 psia.

27. The process of claim 14 wherein the sidestream product gas is at a pressure of 20 psia.

* * * * *